United States Patent [19]
Stanton

[11] 3,810,559
[45] May 14, 1974

[54] BICYCLE - ATTACHED ARTICLE CARRIER
[76] Inventor: Thomas A. Stanton, 350 S.W. 67th Ave., Pembroke Pines, Fla. 33023
[22] Filed: Jan. 10, 1972
[21] Appl. No.: 216,379

[52] U.S. Cl. ............................... 224/41, 287/54 E
[51] Int. Cl. ............................................ B62j 11/00
[58] Field of Search............ 224/39 R, 41, 30 A, 31, 224/36, 30 R; 287/54.1, 52.02, 54 E

[56] References Cited
UNITED STATES PATENTS
2,079,851   5/1937   Glenny............................ 224/41 X
2,253,649   8/1941   Price.................................... 224/36
3,425,722   2/1969   McCauley....................... 287/52.02
3,204,481   9/1965   Golden............................. 287/54 E Primary Examiner—Gerald M. Forlenza
Assistant Examiner—Jerold M. Forsberg
Attorney, Agent, or Firm—William J. Flynn

[57] ABSTRACT

An article carrier for attachment to a bicycle at the front. This article carrier has internal surfaces which conform snugly to the external surfaces (including surface discontinuities) on the center post and neck of the bicycle to provide a non-slip attachment.

10 Claims, 8 Drawing Figures

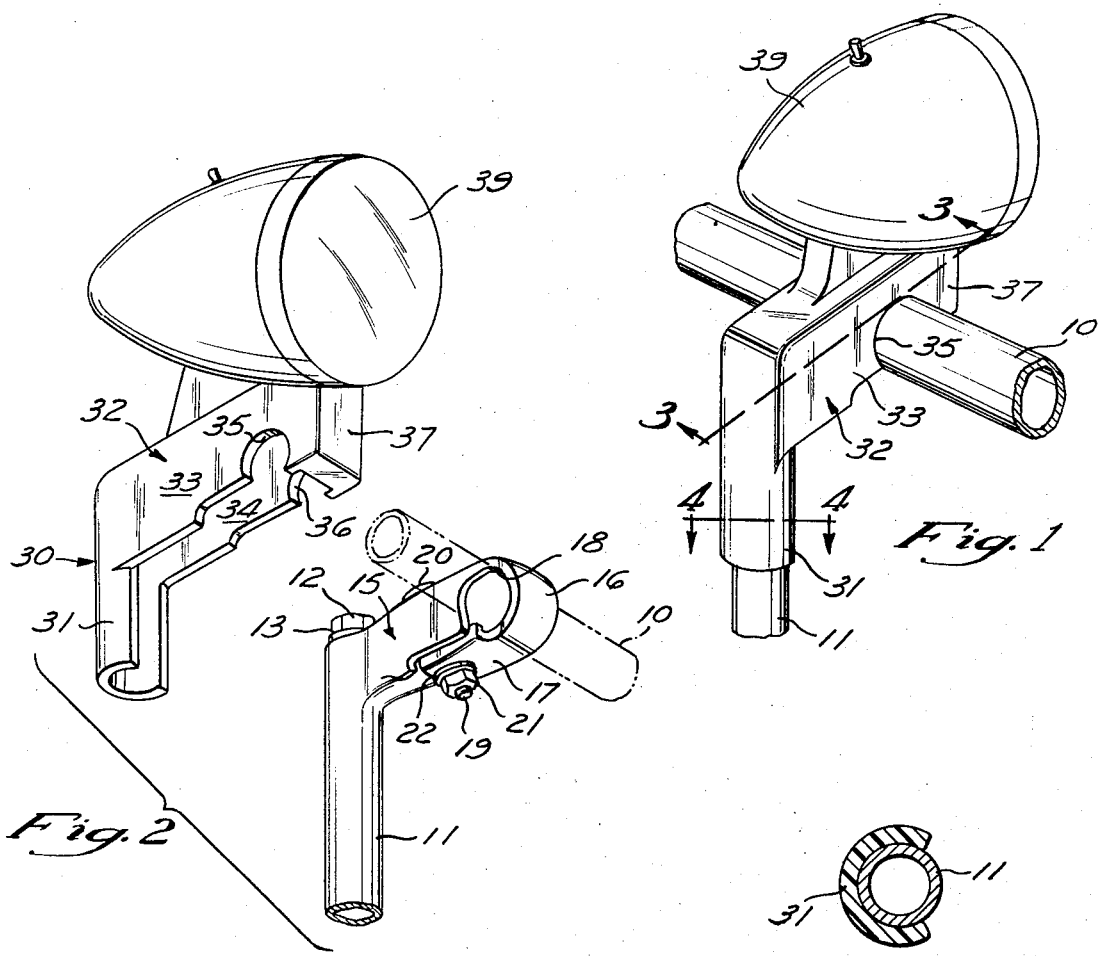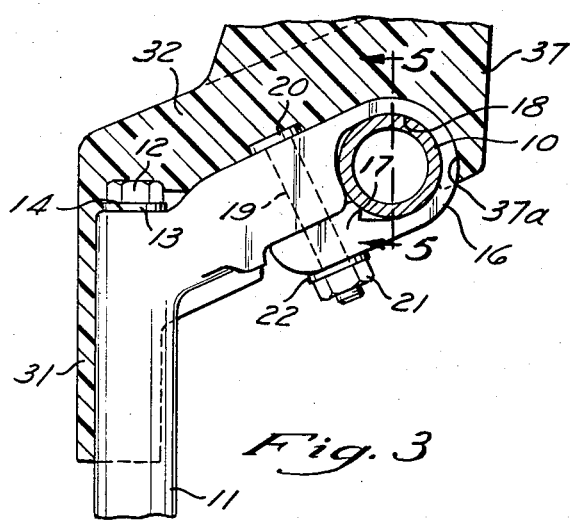

BICYCLE - ATTACHED ARTICLE CARRIER

This invention relates to an article carrier for attachment to a bicycle at the front.

Various carriers for such articles as lamps and baskets have been proposed heretofore for attachment at the front of a bicycle. Commonly, such article carriers are attached to the bicycle by metal-to-metal clamping engagement with the handlebar. Because of the smooth and regular configuration of the external surfaces of the handlebar such clamping engagement is not entirely reliable, and such article carriers may slip out of place. Also, the metal-to-metal engagement may mar the surface coating on the handlebar and possibly lead to premature rusting.

The present invention is directed to a novel article carrier which avoids these disadvantages and is adapted to be attached readily at the front of a bicycle in such a manner that the weight of the article which it carries will be centered with respect to the bicycle and, therefore, will not make it significantly more difficult to handle the bicycle.

Accordingly, it is a principal object of this invention to provide a novel and improved article carrier for attachment to a bicycle at the front.

Another object of this invention is to provide such an article carrier which is constructed and arranged to be readily attached to or removed from the bicycle at the center post located above the front wheel.

Further objects and advantages of this invention will be apparent from the following detailed description of two presently preferred embodiments thereof, which are illustrated in the accompanying drawings.

In the drawings:

FIG. 1 is a rear perspective view showing a one-piece article carrier in accordance with the present invention which supports a lamp from the center post of a bicycle;

FIG. 2 is a front view of FIG. 1 assembly in exploded perspective;

FIG. 3 is a longitudinal section taken along the line 3—3 in FIG. 1;

FIG. 4 is a horizontal section taken along the line 4—4 in FIG. 1;

FIG. 5 is a vertical cross-section taken along the line 5—5 in FIG. 3;

Figure 6:
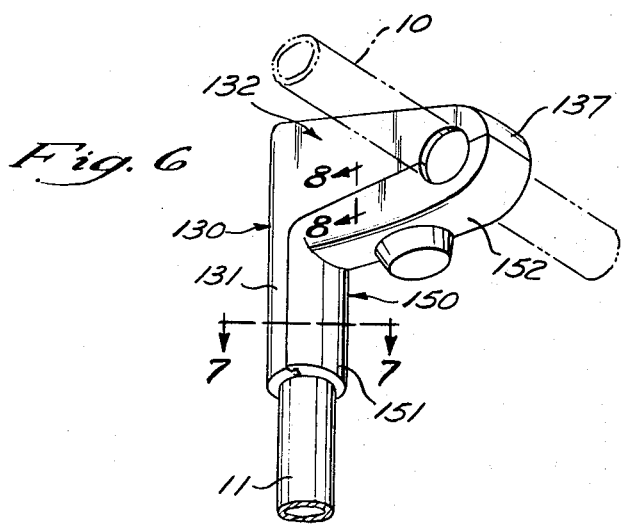
FIG. 6 is a front perspective view showing a two-piece article carrier in accordance with the present invention.

Referring first to FIG. 2, a typical center post and neck assembly for supporting a bicycle handlebar 10 is shown.

This assembly comprises an upstanding, vertical center post 11, a clamping bolt extending down through the hollow interior of this post and having an enlarged hex head 12 disposed above the upper end of the center post 11, and a washer 13 engaged between the bolt head and the top 14 of the center post. The lower end of the center post is received in the usual fork (not shown) which overlies the front wheel of the bicycle.

The center post, bolt and washer together make up what I call herein the "center post unit" on the bicycle.

The center post and neck assembly also includes a neck 15 attached to the center post 11 at the latter's upper end, preferably by being formed integral therewith. This neck 15 extends transverse to the vertically disposed center post 11 in a direction lengthwise of the bicycle and at a slight upward inclination away from the center post. At its end away from the center post the neck is bent down and around through a curvature of 180°, providing a semi-circular back end 16 and a lower return leg 17 spaced below the top of the neck. Immediately in front of its back end 16 the neck is cut away to provide a generally circular opening 18 at each side for receiving the handlebar 10.

A nut and bolt assembly coacts with the neck 15 to releasably clamp the handlebar inplace. This assembly comprises a bolt 19 having an enlarged head 20 overlying the top of the neck 15, a nut 21 threadedly engaging the lower end of this bolt below the lower return leg 17 of the neck, and a washer 22 engaged between this nut and the bottom face of the return leg 17.

The entire neck 15, 16, 17 and the bolt, nut and washer assembly 19–21 together constitute what I call herein the "neck unit" on the bicycle.

From FIGS. 2 and 3, it will be evident that this center post and neck assembly on the bicycle has several external surface discontinuities. For one, at the juncture between the center post 11 and the neck 15 there are surface discontinuities because of the rather pronounced change of direction. Also, at the top of the center post the bolt head 12 provides a sharp surface discontinuity and this is also true of the bolt head 20 at the top of the neck 15.

The article carrier of the present invention takes advantage of these surface discontinuities to insure the snug positioning of the article carrier on the center post and neck assembly on the bicycle. The inside surfaces of the article carrier conform snugly to the external surfaces on the center post and neck assembly, especially at the latter's surface discontinuities, so that after being applied the article carrier is not likely to slip out of place.

Also, the article carrier of the present invention has different segments which snugly straddle different portions of the center post in different directions transverse to each other, so that any tendency for the article carrier to slip in any direction is opposed by its straddling action in an opposing direction, as will be apparent from the following detailed description.

Referring to FIG. 2, the article carrier shown there is a one-piece body 30 of suitable deformable and resilient rubber-like or plastic material which is preformed to a shape providing inside surfaces that are substantially complementary to the external surfaces on the center post and neck assembly. That is, this one-piece body may be visualized as having been molded around the center post unit and the neck unit.

The article carrier body 30 has an upstanding segment 31 which is generally C-shaped in cross-section, as best seen in FIG. 4, for snug, resilient engagement with the outside of the center post 11 for about two-thirds of the way around the latter circumferentially. This upstanding segment 31 of the article carrier body straddles the center post from back to front, lengthwise of the bicycle.

The article carrier body 30 also has a transversely extending segment 32 which is joined integrally to its upwardly extending segment 31 at the latter's upper end.

This segment 32 is approximately of inverted U-shape in cross section for snug, resilient engagement with the bicycle neck 15 across the top and down along the opposite sides of the latter, so that it straddles the neck 15 and the upper end of the center post from above in a direction from side-to-side on the bicycle.

The transversely extending segment 32 of the article carrier body has its opposite depending sides 33 and 34 cut away circularly at 35 and 36 for snug engagement with the handlebar 10 on opposite sides of the curved front end 16 of the bicycle neck 15, as best seen in FIG. 5. At this location the article carrier body closely straddles the neck 15 from side to side and is in direct contact with the top and the side edges of the neck throughout about two-thirds of the way around the openings 18 in the neck.

Just in front of its side openings 35 and 36 the transversely extending segment 32 of the article carrier body presents a depending lip 37, which extends down in front of the curved front end 16 on the bicycle neck 15. As shown in FIG. 3, this depending lip 37 has an inside surface 37a which is complementary to, and in snug engagement with, the front end 16 of the neck. At its opposite end, the transversely extending segment 32 of the article carrier body extends down across the back surfaces of the bolt head 12 and the upper end of the center post 11 in direct contact with these surfaces. Consequently, the transversely extending segment 32 of the article carrier body straddles the entire upper end of the center post and neck assembly from front to back, as well as straddling the neck 15 from side to side throughout substantially its entire extent.

In the particular embodiment shown in FIGS. 1 and 2, the article carrier supports a lamp 39. However, it should be understood that it may support a variety of other articles, such as a basket, a decorative figure, or a small radio.

The material of the one-piece article carrier body of FIGS. 1–5 is sufficiently deformable that it may be forced onto the center post and neck assembly of the bicycle, after which its resiliency restores the article carrier body to substantially its preformed shape. Any deformation that may remain is due to its snug gripping engagement with the center post and neck assembly on the bicycle.

Figure 7:
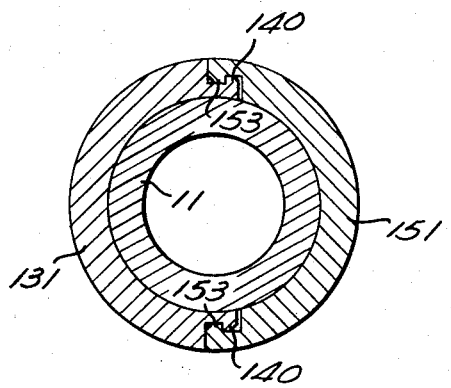
FIG. 7 is a horizontal cross-section taken along the line 7—7 in FIG. 6.
Figure 8:
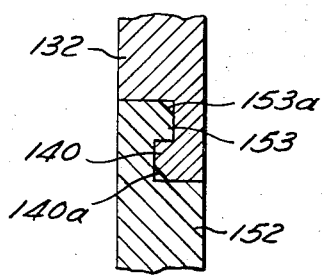
FIG. 8 is an enlarged fragmentary section taken along the line 8—8 in FIG. 6 and showing how the two halves of the article carrier fit together at one side.

FIGS. 6–8 illustrate a second embodiment of this invention, in which the article carrier is made up of two pieces which together substantially completely enclose the center post and neck assembly.

One piece of this two-piece article carrier is basically similar to the previously described one-piece body of FIGS. 1–5, except that it extends only about half-way around the center post and the neck where it engages them. This first piece 130 has inside surfaces which are substantially complementary to the outside surfaces on the center post and neck assembly, and it straddles this assembly in different directions, in the manner already described with reference to FIGS. 1–5.

A second piece 150 of this two-piece article carrier has an upstanding segment 151 of C-shaped cross-section which snugly engages the front side of the center post 11. Also, it has a transversely extending segment 152 which snugly engages the underside of the neck unit on the bicycle. The inside surfaces of this second piece of the two-piece article carrier are complementary to the outside surfaces on the center post and neck assembly, including the surface discontinuities on the latter, such as at the nut 21 on the lower end of bolt 19.

The two pieces of this article carrier are constructed to be snapped together at their abutting edges. As shown in FIGS. 7 and 8, they have complementary lips and grooves which interfit snugly at these edges. The respective outer and inner edges of these lips 140 and 153 are chamfered at 140a and 153a, respectively, as best seen in FIG. 8, to facilitate snapping them together in assembled relationship.

If desired, any other suitable method of interconnecting the two halves of the article carrier may be substituted for this lip and groove arrangement.

The two halves of this two-piece article carrier may be of metal or plastic, as desired.

The two-piece construction of the article carrier may be preferred over the one-piece body of FIGS. 1–5 where the article to be supported by it is relatively heavy.

While two different presently preferred embodiments of this article carrier have been disclosed herein, it is to be understood that various modifications which depart from the disclosed embodiments may be adopted without departing from the teaching of this invention.

I claim:

1. An article carrier for attachment to a bicycle having a center post and neck assembly including an upstanding center post and a neck joined to the upper end of said center post and extending transverse thereto in a direction lengthwise of the bicycle, said center post and neck assembly having external surface discontinuities, and a handle bar extending through and supported by said neck away from the latter's attachment to the center post, said article carrier comprising:

a body which is shaped and dimensioned to straddle said center post and neck assembly in snug engagement therewith at least substantially half-way around said center post and around said neck along substantially the complete extent of said neck from front to back and along said center post for an appreciable distance down from its juncture with said neck, said body having internal surfaces which substantially conform snugly to the external surfaces on said center post and neck assembly, including the surface discontinuities thereon, and which restrain the body against displacement on said center post and neck assembly, said body being insertable manually over said center post and neck assembly from above and from the end thereof away from the handlebar.

2. An article carrier according to claim 1, wherein said body has an upwardly extending segment which straddles said center post along its upward extent, and a transversely extending segment which is joined to the upper end of said upwardly extending segment and which overlies and straddles said neck from side to side along its complete extent transverse to the center post, and said transversely extending segment also straddles the top of said center post and neck assembly from front to back.

3. An article carrier according to claim 2, wherein said body has a downwardly facing internal recess which snugly engages around the head of a bolt located at the upper end of the center post.

4. An article carrier according to claim 3, wherein said body has a downwardly facing recess which snugly engages around the head of a bolt located at the top of said neck between the latter's attachment to the center post and the handlebar.

5. An article carrier according to claim 2, wherein said body has a downwardly facing recess which snugly engages around the head of a bolt located at the top of the neck between the latter's attachment to the center post and the handlebar.

6. An article carrier according to claim 1, wherein said body is of resilient rubber-like or plastic material and is preformed to snugly engage around the center post and neck assembly when applied thereto.

7. An article carrier according to claim 2, wherein said body is of resilient rubber-like or plastic material and is preformed to snugly engage around the center post and neck assembly with its internal surfaces conforming to the external surfaces on the latter, said body being deformable when being applied to the center post and neck assembly and, after being applied, returning to its preformed shape.

8. An article carrier according to claim 1, and further comprising a second piece which straddles the opposite side of the center post and neck assembly from said body, said second piece being attached to said body.

9. An article carrier according to claim 8, wherein said second piece has inside surfaces which conform snugly to the external surfaces on said opposite side of the center post and neck assembly.

10. An article carrier according to claim 2, and further comprising a second piece which straddles the opposite side of the center post and neck assembly from said body, said second piece having inside surfaces which conform snugly to the external surfaces on said opposite side of the center post and neck assembly, said second piece being attached to said body.

* * * * *